United States Patent Office 2,914,075
Patented Nov. 24, 1959

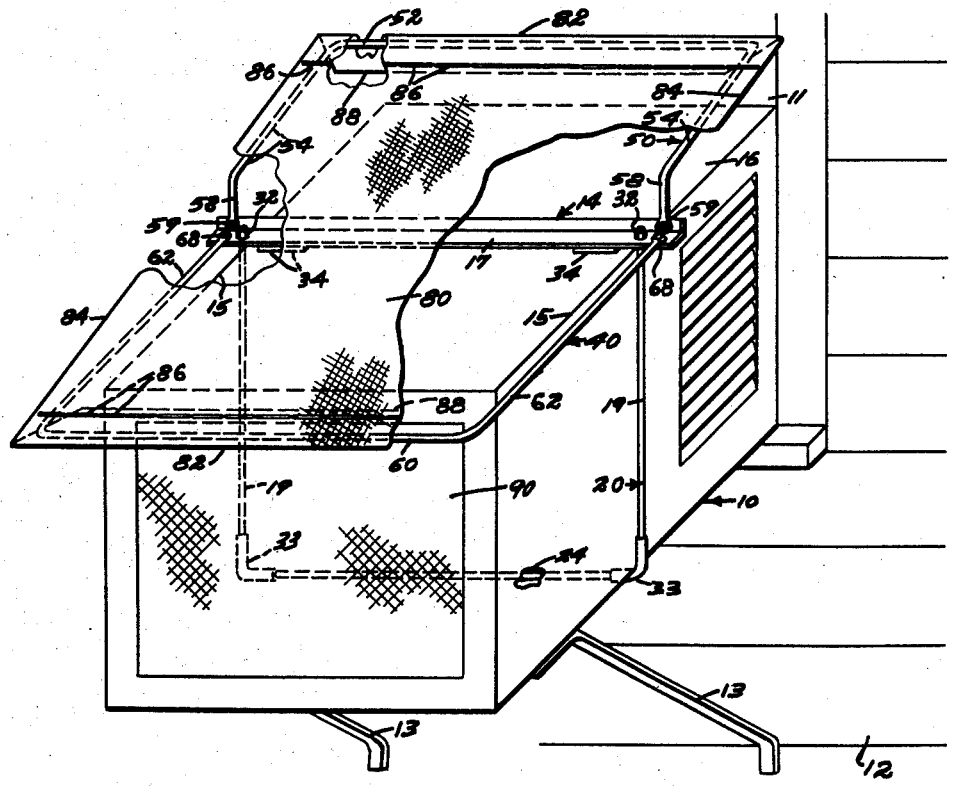

2,914,075

SUN PROTECTION ASSEMBLY FOR WINDOW-TYPE AIR CONDITIONING UNIT

James R. Wells and James B. Thompson, Omaha, Nebr.

Application February 8, 1955, Serial No. 486,807

4 Claims. (Cl. 135—5)

This invention relates to air conditioning units of the type that are mounted in and protrude outwardly from the window openings of houses and buildings and more particularly it is an object of this invention to provide a sun-protection assembly for protecting the outer portion of such air-conditioning units from the sun.

It has been found that air conditioning units of this type run much more efficiently in the shade than in the sun inasmuch as the outer portion thereof is for the purpose of dissipating heat.

At times in the summer and particularly on hot days large numbers of air-conditioning units in different locations of a city will cease to function because the heat of the sun on the housing causes heat to build up inside the unit causing improper and insufficient heat dissipation from the Freon coils which in turn causes the Freon not to be converted to liquid whereby the unit ceases to function properly.

Accordingly it is an object of this invention to provide a sun protection assembly for improving the efficiency of operation of an air-conditioning unit.

Yet a further object is to provide a sun protection assembly which is attachable to the air conditioning unit alone, not requiring any attachment to the building to which the air-conditioning unit is attached.

Air-conditioners vary greatly in the distances they project outwardly of the window opening and it is an object of this invention to provide a sun protector which can be selectively positioned along the housing of an air conditioner to adjust to and accommodate the particular distance the air conditioner housing projects outwardly of the window opening.

Yet further objects of the invention are to provide a sun protector, the upper cover of which is formed of a flexible material rather than of metal to avoid the noise which attends rain falling on a metal surface, and formed of porous material to permit breathing or escape of heat vertically therethrough, and formed of a material relatively much more insulating than metal.

A particular object of this invention is in the provision of a sun-protector having a shield portion disposed closely adjacent the air conditioner so as to more thoroughly protect the air-conditioner from the rays of the sun and particularly from the more intense and direct rays of the sun, the shield portion being disposed close to the upper side of the air conditioner unit housing in order to prevent the more direct and intense rays of the sun from striking the top of the air conditioner. For example, when the air-conditioning unit is disposed on the south side of the house this construction will prevent the sun from the east and west from striking the unit until the sun is sufficiently low so as to be of much less intense heat.

A particular object is to provide a sun protection unit the underside of which is substantially flat, rather than being concave, so as to permit the escape of hot air from the area under the shield as is particularly important inasmuch as we desire the shield to be disposed very close to the top of the air conditioner.

A further object of the invention is to provide a sun protector shield portion which is disposed at an inclination extending downwardly from an upper end adjacent the building on which the air-conditioner is mounted to a lower side at the outer end of the air-conditioner so as to provide an inclined surface for the delivery of rain away from the window, and to prevent pocketing of the flexible material; the inclination downwardly toward the outer end, rather than from one side to the other, being of advantage because the rays of the sun would more easily enter under a side edge if one side edge were disposed higher than the other.

Yet a further object of this invention is to provide a particular construction for the pocketing of the corners of the cover of the sun protector to permit the side portions of a supporting frame to extend underneath the upper cover and spaced inwardly from the side edges thereof and yet permitting the stitching of the cover in manufacture completely from one side to another of the cover.

Yet a further object is to provide a sun protector for an air conditioner the sides of which are open to permit the circulation of air through the space between the sun protector and the air conditioner so that the upper portion of the sun protector will not trap heat thereunder as would otherwise be the case.

A further object of this invention is to provide a sun protector having a supporting frame so designed as to receive and be attached to air conditioners of various transverse widths.

Yet a further object is to provide a sun protector, the side edges of which overlap the side edges of the air conditioner for better protection from slanting rays of the sun.

Yet a further object is to provide a sun protector the outer end of which does not extend vertically downward across the outer end of the air conditioner whereby it does not interrupt the flow of air, being open at its outer end.

Yet a further object of the invention is to provide a sun protection assembly the frame of which is provided with means for cushioning its contact with the housing of the air conditioner to prevent vibration wear.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawing:

The drawing shows a perspective view of an air-conditioner with the sun-protector of this invention mounted thereon, parts of both being broken away and other parts being shown in section for purposes of illustration.

The air conditioning unit used with this invention, as seen in the drawing, has a rectangular cabinet or housing portion 10 partly protruding outwardly of a window disposed generally in the area 11 of a building 12, the unit being upheld by braces 13. The air conditioner is one of a type using any suitable cooling liquid such as Freon in coils. In accordance with this invention a transverse or cross member of angle iron is provided at 14, extending outwardly beyond the side edges 15 of the top 16 of the cabinet or housing 10 of the air conditioner.

The angle iron 14 is horizontally disposed and has vertical apertures through a horizontal portion 17 thereof, and adjacent the side edges 15, for receiving vertical portions 19 of a U-shaped member 20, which latter has a horizontal portion 24 extending under the bottom of the air conditioning unit housing 10. The side portions 20 extend vertically upwardly from the bottom portion 24 of the U-shaped member 20 and extend through apertures in the angle iron 14. The upper ends of the side portions 20 are threaded for receiving nuts 32 which permit the angle iron 14 to be drawn down tightly against the cabinet 10.

Cushion sleeves 33 of compressible material are disposed on the U-shaped member 20 extending around each corner thereof to protect against vibration-wear and for the same reason cushions 34 are disposed under the ends of the angle iron 14.

When the nuts 32 are drawn taut, the angle iron 14 is rigidly held in place by compression against the cabinet 10 rigidly for supporting a lower frame member generally indicated at 40 and an upper frame member generally indicated at 50. The upper frame member 50 has a horizontally disposed portion 52 extending crosswise of the air-conditioner unit housing 10 and in parallelism with the angle iron 14.

The cross portion 52 is connected to two downwardly inclining portions 54 which are disposed at right angles to the cross portion 52 and extend outwardly from the building 12 lengthwise of the housing 10 and downwardly, joining vertically disposed portions 58 which are integral therewith and which latter extend downwardly to and are suitably fixed, such as by means of bolts 59, to the vertical portion of the angle iron 14.

The horizontal and upper portion 52 of the member 50 is disposed spaced apart upwardly from the housing 10 and closely adjacent the building 12.

The lower frame member 40 has a transverse portion 60 which is disposed horizontally and has side portions 62 which extend at right angles to the portion 60 and inwardly toward the building 12 and being secured to the horizontal portion of the angle iron 14, by means of bolts or the like 68. The outer horizontal portion 60 of the frame member 40 is disposed spaced horizontally outwardly from the outer end of the air conditioner unit housing 10 for a purpose later described. As thus described, it will be seen that the above frame members comprise a mounting means which is adjusted for clamping to air-conditioning units of various sizes, the clamping means comprising members adapted to grip the bottom and top of an air-conditioner having horizontal bottom and top surfaces with sufficient force to anchor the mounting to the air-conditioner.

A cover or sun-shield 80 is provided covering the frame members 40 and 50.

The sun-shield 80 is adapted to be anchored on the portions 52 and 60 respectively of the members 40 and 50 and at the ends 32 of the sun-shield 80, the sides 84 of the sun-shield 80 are free.

The frame portion 60 is disposed substantially in the same horizontal plane with the top of the air-conditioning unit cabinet 10 whereby the sun-shield 80 is disposed inclining downwardly from the member 52 to the lower member 60 for shedding rain, rather than inclining from side to side as would let sun rays in under the upper side.

The inner and outer ends of the sun-shield 80 are folded under and inwardly and the edges thereof are mitered inwardly at angles of forty-five degrees whereby only one stitch 86 at each end of the sun-shield and at high mass-production speed completely across the sun shield 80 transversely from side to side will form pockets 88 at each end having open ends permitting the sides 54 and 62 respectively of the frame members 40 and 50 to extend through the open ends and to be disposed inwardly of the side edges 84 of the sun-shield 80.

The material of the sun-protection shield 80 is preferably flexible rather than metal to avoid the noise which attends rain falling on a metal surface, although we do not wish to be limited to any single material. The shield 80 is also preferably formed of porous material to permit breathing or escape of heat vertically therethrough and is also preferably formed of a material relatively much more insulating than metal. For these reasons we prefer to use canvas.

It will be seen that the undersurface of the shield 80 is flat which permits the escape of hot air, as would be trapped thereunder if the shield 80 were concave on its under side.

It will be seen that the U-shaped member 20 can be adjusted toward and away from the outer end of the cabinet 10 in accordance with the particular distance which a given cabinet 10 protrudes outwardly from the building.

It will be seen that the shield portion 80 is disposed as close to the top 16 of the air-conditioner cabinet 10 as is practical consistent with the necessity of inclining the shield 80. The closer the shield 80 is to the top of a cabinet 10 the less likely it will be for the sun's rays to enter through the space between the edges of the shield 80 and the top of the air-conditioner, particularly during the middle of the day when the rays are more direct and the heat is more intense.

The outermost end of the lower frame member 40 protrudes beyond the open outer end 90 or opening 90 of the cabinet 10 a substantial distance so as to shade the end 90 without the serious interruption of the flow of air through the open end 90 as would be the case if the outer end of the shield 80 extended down over a part of the air intake end 90 of the air-conditioner unit 10. The protruding portion of the unit thus has an opening 90 for the flow of air therethrough which is of an area greater than one-half of the transverse cross-sectional area of the outwardly protruding portion of said unit as taken along a plane parallel to the side of the building.

An operational test of the unit was made as follows:

In a heat test under twelve infra-red lamps, an air conditioner without the sun protector was exposed to the heat and the temperature of the metal on its upper surface went up to 170° F. The cool air from the delivery end of the air conditioner went up from 42° F. to 68° F. from this application of heat lamps, with incoming air at all times being 70° F.

After putting the sun protector of this invention on the unit, and under the same heat lamps, and with the incoming air still at 70° F., the temperature of the metal on the upper surface of the air conditioner housing was brought down from 170° F. to 140° F. in only ninety seconds. At the end of four minutes the temperature of the metal of the upper side of the housing was brought down to 86° F.

The temperature of the air coming out of the delivery end of the unit dropped from 68° under identical conditions without the sun-protector to 44° F. with the protector.

As thus described it will be seen that this invention provides a sun protection assembly for an air-conditioning unit particularly adapted to fulfill the above stated objects.

It will be seen that all parts of the frame that are disposed between the upper cover and the air conditioner are shaded by the cover and are disposed under the cover whereby they are more cool and do not conduct heat to the air conditioner housing in the way they would if they were hot.

From the foregoing description, it is thought to be obvious that a sun protection assembly for window-type air conditioning units constructed in accordance with our invention is particularly well adapted for use, by reason of the convenience and facility with which it may be assembled and operated, and it will also be obvious that our invention is susceptible of some change and modification without departing from the principles and spirit thereof, and for this reason we do not wish to be understood as limiting ourselves to the precise arrangement and formation of the several parts herein shown in carrying out our invention in practice, except as claimed.

We claim:

1. In combination with an air conditioner mounted in a window and having a substantial part thereof extending outwardly exteriorly of the window opening, a cross member extending transversely across the top of that portion of the air conditioner exterior of the window, clamping means secured to said cross member and engaging said air conditioner for securing said cross member to said air conditioner, a first sun shade supporting member supported by and extending from said cross member toward and beyond, and extending the full width of the outer edge of the air conditioner, a second sun shade supporting member supported by said cross member and extending upwardly and rearwardly toward the window above the top of said air conditioner, and a flat sun shade of relatively thin material conjointly supported in spaced relation above said air conditioner by said first and second sun shade supporting members completely overlying said air conditioner, said shade being inclined downwardly and outwardly from the window to provide an air space between said shade and the top of the air conditioner.

2. The structure of claim 1 wherein said cross member comprises an angle iron, said mentioned shade supporting frame comprises a U-shaped member extending horizontally from a horizontal leg of said angle iron member, and said second frame comprises a substantially U-shaped member, the legs of which include angularly disposed end portions, the angularly disposed end portions being secured to the vertical leg of the angle iron to support the bight and legs of said last mentioned U-shaped member in spaced relation to the top of said air conditioner.

3. The structure of claim 2 wherein said clamping means includes a U-shaped member having threaded ends surrounding said air conditioner, the horizontal leg of said angle iron being apertured to receive the ends of said last mentioned U-shaped member, and nuts secured on said threaded ends to clampingly engage said clamping means with said angle iron cross member to secure said cross member and hence said first and second shade supporting members firmly about said air conditioner.

4. In combination with an air conditioner mounted in a window and having a substantial part thereof extending outwardly exteriorly of the window opening, a cross member extending transversely across the top of that portion of the air conditioner exterior of the window, clamping means secured to said cross member and engaging said air conditioner for securing said cross member to said air conditioner, sun shade supporting means supported by and extending from said cross member toward and beyond, and extending the full width of the outer edge of the air conditioner and extending upwardly and rearwardly toward the window above the top of said air conditioner, and a flat sun shade of relatively thin material conjointly supported in spaced relation above said air conditioner by said sun shade supporting means completely overlying said air conditioner, said shade being inclined downwardly and outwardly from the window to provide an air space between said shade and the top of the air conditioner.

References Cited in the file of this patent

UNITED STATES PATENTS

| | | |
|---|---|---|
| 1,280,109 | Silverton | Sept. 24, 1918 |
| 2,029,886 | Marshall | Feb. 4, 1936 |
| 2,269,205 | Hubbard | Jan. 6, 1942 |
| 2,359,051 | Roper | Sept. 26, 1944 |
| 2,502,103 | Puls | Mar. 28, 1950 |
| 2,592,174 | O'Connell | Apr. 8, 1952 |
| 2,643,053 | Sherman et al. | June 23, 1953 |
| 2,705,990 | Miller | Apr. 12, 1955 |
| 2,711,769 | Katcher et al. | June 28, 1955 |
| 2,720,236 | Hoffman | Oct. 11, 1955 |